(12) United States Patent
Kirchner et al.

(10) Patent No.: US 7,874,800 B2
(45) Date of Patent: Jan. 25, 2011

(54) WIND ENERGY PLANT WITH A PITCH BEARING

(75) Inventors: Jens Kirchner, Vorbeck (DE); Ulf Gopfert, Rostock (DE); Karsten Koop, Rostock (DE)

(73) Assignee: Nordex Energy GmbH, Norderstedt (DE)

( * ) Notice: Subject to any disclaimer, the term of this patent is extended or adjusted under 35 U.S.C. 154(b) by 783 days.

(21) Appl. No.: 11/760,046

(22) Filed: Jun. 8, 2007

(65) Prior Publication Data

US 2008/0191488 A1 Aug. 14, 2008

(30) Foreign Application Priority Data

Feb. 14, 2007 (DE) .................. 10 2007 008 166

(51) Int. Cl.
*F03D 1/06* (2006.01)
*F03D 11/00* (2006.01)

(52) U.S. Cl. ....................... 416/155; 416/205
(58) Field of Classification Search ............... 416/155, 416/160, 205

See application file for complete search history.

(56) References Cited

U.S. PATENT DOCUMENTS 5,660,527 A * 8/1997 Deering et al. ............ 416/205

FOREIGN PATENT DOCUMENTS

| DE | 100 34 958 A1 | 2/2002 |
|---|---|---|
| DE | 20 2004 003521 U1 | 6/2004 |
| DE | 20 2004 003 521 U1 | 7/2004 |
| DE | 103 51 524 A1 | 8/2004 |
| DE | 102 01 726 B4 | 10/2004 |
| DE | 20 2005 007 450 U1 | 8/2005 |
| DE | 10 2004 017 323 A1 | 11/2005 |
| DE | 10 2004 023 773 B3 | 11/2005 |
| DE | 10 2004 023733 B3 | 11/2005 |
| EP | 1 933 027 A1 | 6/2008 |
| WO | 03/064854 A1 | 8/2003 |
| WO | 2004/090326 A1 | 10/2004 |
| WO | WO 2007003866 A1 * | 1/2007 |

OTHER PUBLICATIONS

"Wind Turbines, Fundamental, Technologies, Application, Economics" by Eric Hau, Springer, 2006, pp. 241-244. English version of Windkraftanlagen, Gundlagen, Technik, Einstaz, Wirtschaftlichkeit, 3rd Edition, Springer Verlag Berlin, Chapter 7.5.

* cited by examiner

*Primary Examiner*—Edward Look
*Assistant Examiner*—Jesse Prager
(74) *Attorney, Agent, or Firm*—Vidas, Arrett & Steinkraus

(57) ABSTRACT

A wind energy plant with a rotor hub housing, which is connectable to at least one pitch bearing via joining means, and with at least one rotor blade, the blade root of which is connected to the pitch bearing, wherein a stiffening element is provided, which is fastened between the pitch bearing and the rotor hub housing.

14 Claims, 2 Drawing Sheets

WIND ENERGY PLANT WITH A PITCH BEARING

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to wind energy plant with a rotor hub housing, which has a pitch bearing.

The pitch bearing is a rolling bearing with an inner and an outer ring, one of the rings being connected to the rotor hub housing and the other ring being connected to the rotor blade. Via a pitch system, which consists preferably of a pitch drive, a pitch control and for instance an auxiliary power supply, the rotor blade is rotated around its longitudinal axis and thus its angle of attack is adjusted towards the wind.

Known constructions for the rotor hub housing consist of a cast body with a flange for mounting the pitch bearing. Erich Hau describes in "Windkraftanlagen, Grundlagen, Technik, Einsatz, Wirtschaftlichkeit, 3th edition, Springer Verlag Berlin" in chapter 7.5, the entire contents of which is incorporated herein by reference, that the quality and the weight of the rotor blades is essentially determined by the construction of the blade joining to the rotor hub, besides to the proper execution of the rotor blade.

From DE 10 2004 023 773 B3, the entire contents of which is incorporated herein by reference, it is known to realise the pitch bearing with an inner ring, which is fixedly connected to the rotor hub. The outer ring connected to the rotor blade has an outer toothing which is in meshing engagement with a drive pinion of the pitch system for adjusting the rotor blade.

From DE 10 2004 017 323 A1, the entire contents of which is incorporated herein by reference, a blade joining for a rotor blade is known, in which an arresting device is provided, which keeps the rotor blade free from backlash with a predetermined angle position.

From WO 2004/090326 A1, the entire contents of which is incorporated herein by reference, a rotor hub body is known, which has a three-arm stiffening, formed in one piece, in the region of the rotor blade joining.

From DE 20 2004 003 521 U1, the entire contents of which is incorporated herein by reference, a rotor hub body for a wind energy plant is known, which is realised with ring flanges for fastening a pitch bearing. Inside the ring flanges, one stiffening bulkhead is provided at a time, which is realised either as a cast piece in one piece with the rotor hub housing, or which can be welded or screwed together with the rotor hub as an autonomous component part. The stiffening bulkhead is disposed in the rotor hub housing at a side facing the rotor shaft.

The present invention is based on the objective to provide a stiffening element for a rotor hub housing which simplifies the installation of the wind energy plant.

BRIEF SUMMARY OF THE INVENTION

The wind energy plant according to the present invention has a rotor hub casing, on which at least one pitch bearing is attachable via joining means. A rotor blade is fixed on the pitch bearing with its blade root; preferably it is screwed together with the same.

According to the present invention, a stiffening element is provided, which is arranged between the pitch bearing and the rotor hub housing and fastened on the same via joining means. The stiffening element according to the present invention is formed as a separate construction part and it has the particular advantage that it can be mounted on the rotor hub housing together with the pitch beating. In this, the installation takes place preferably via the same joining means by which the pitch bearing is attached on the rotor hub housing, the stiffening element being preferably screwed to the rotor hub housing together with the pitch bearing in. A further advantage of the stiffening element according to the present invention is that in contrast to a rotor hub housing cast in one piece, the basic body of the rotor hub housing and the stiffening elements can be produced much more simply with respect to the casting technique.

Practically, the stiffening element has circularly arranged through-bores, which are provided for the accommodation of screws.

In one preferred embodiment, the stiffening element serves as a carrier element for components of the pitch system at the same time. The components can be independently mounted onto the stiffening element. Also, before installation to the rotor hub housing, the stiffening element can be tested independently.

Preferably, the stiffening element is formed in the shape of a ring. Also, it can be formed in the shape of a disc, plate or vat, wherein one or more openings are then provided in the stiffening element.

In a preferred embodiment, pitch bearing and rotor blade in the region of the blade root on the one hand, and rotor hub housing as well as stiffening element on the other hand are realised such that their stiffnesses correspond to each other. In order to achieve the same stiffness at the rotor blade side and at the rotor hub side, an additional stiffening element can be provided at the rotor blade side between the pitch beating and the rotor blade root. The pitch bearing is preferably realised as a rolling bearing with an inner ring and an outer ring, the outer ring being fixed on the rotor hub and the inner ring being connected to the rotor blade, and as the case may be to a stiffening element at the rotor blade side, for instance. The pitch beating experiences an approximately equal stiffness for both rings. Through this, it is avoided that unequal forces attack on inner ring and outer ring, which load the pitch bearing unfavourably.

BRIEF DESCRIPTION OF THE SEVERAL VIEWS OF THE DRAWINGS

A preferred example of realisation is explained in more detail in the following by means of the drawings.

DETAILED DESCRIPTION OF THE INVENTION

Figure 1:
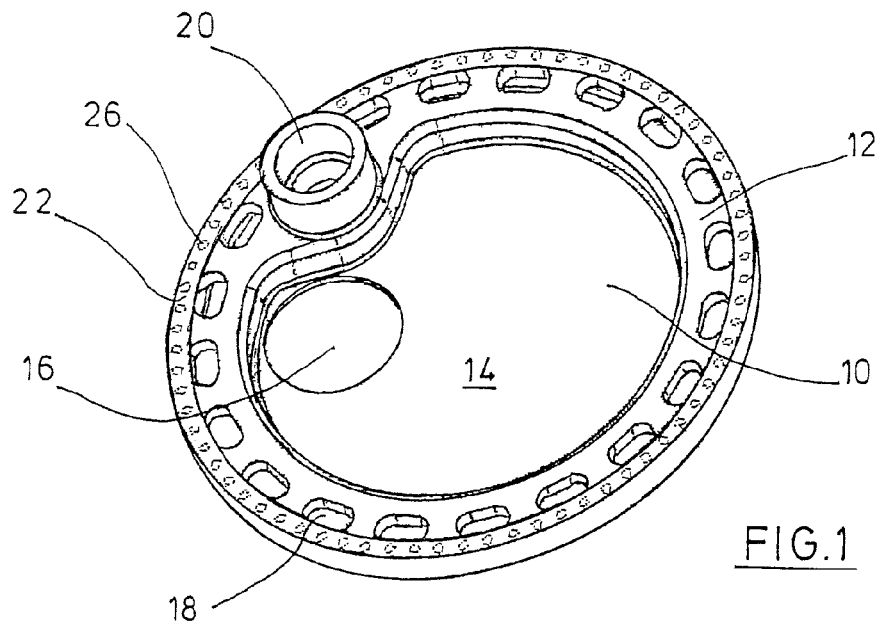
FIG. 1 shows the stiffening element according to the present invention, which is realised as a vat.
Figure 2:
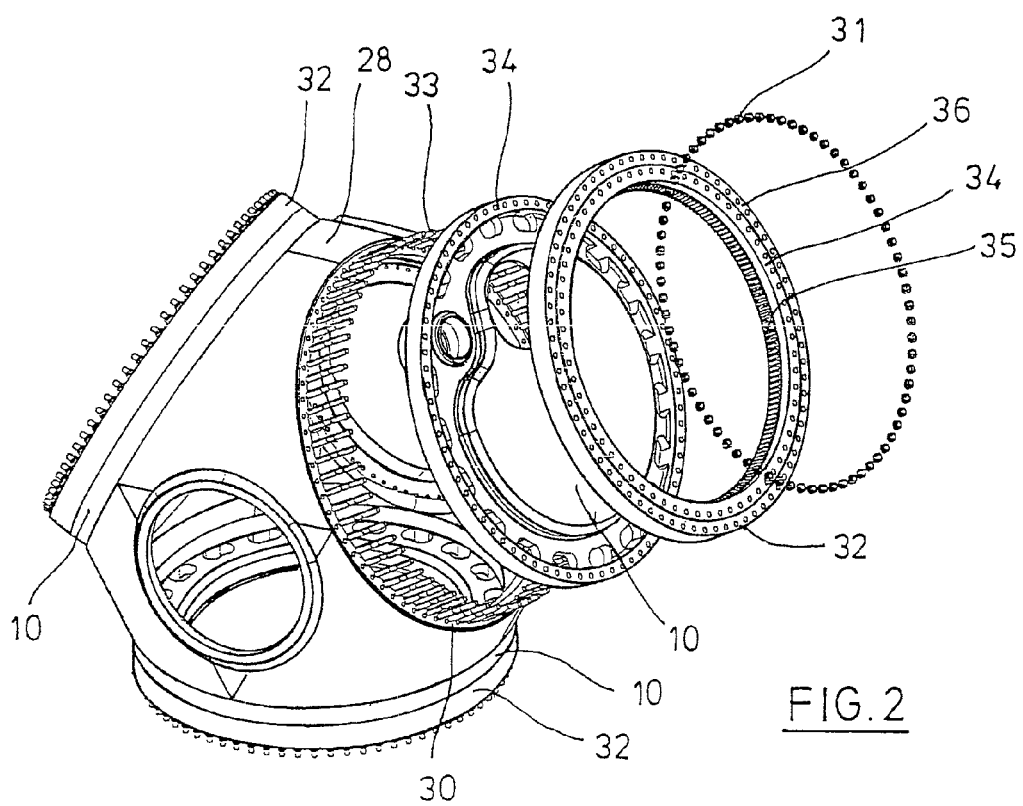
FIG. 2 shows the installation of the stiffening element according to the present invention on the rotor hub housing.

While this invention may be embodied in many different forms, there are described in detail herein a specific preferred embodiment of the invention. This description is an exemplification of the principles of the invention and is not intended to limit the invention to the particular embodiment illustrated FIG. 1 shows a stiffening element 10, which is preferably made from steel or a cast material. As the cast material, cast iron with nodular graphite is preferably used, for instance corresponding to DIN EN 1563 (EN-GJS-400-18, for instance). In a circulating edge 12, the stiffening element 10 is formed significantly thicker than in its central region 14. The central region 14 has a way-through 16, which leads into the rotor blade. The circulating ring 12 is provided with openings 18 in the form of elongated holes, which are needed for the installation of the rotor blade screws. In a region situated at the edge, the circulating ring 12 is provided with a joining piece 20 for attachment of a pitch drive 38. In this region, the circulating ring 12 is broader in the radial direction than in the remaining region of the stiffening element. At its flat sides, the stiffening element 10 is provided on its entire perimeter with flange planes 22, 24 situated on the exterior. In FIG. 1, the flange plane 22 is represented, which points towards the rotor hub housing. In FIG. 2, the opposing flange plane 24 can be recognised, which points off from the rotor hub housing. The stiffening element 10 has circularly arranged through-bores 26, through which fastening bolts (not shown) are guided in the installation of the stiffening element.

FIG. 2 shows a rotor hub housing 28, which is equipped with one stiffening element 10 at a time on each of its three lugs for the rotor blades. For attachment of the stiffening element and the pitch bearing, respectively, the lugs of the rotor hub housing 28 each have a mounting flange 30, from which project fastening bolts 33.

Further, FIG. 2 shows the pitch bearing 32, which consists of a rotatable bearing with an inner ring 34 and an outer ring 36. Inner ring 34 and outer ring 36 are each at a time provided with circularly arranged through-bores. The through-bores of the outer rim correspond to the through-bores 26 of the stiffening element. The fastening bolts 33 on the mounting flange 30 mentioned above pass through the stiffening element 10 and through the outer ring 36 of the pitch bearing 32. The stiffening element 10 and the pitch bearing 32 are secured via nuts 31 on the fastening bolts. The inner ring 34 of the pitch bearing 32 is also provided with circularly arranged through-bores. The inner ring 34 has a toothing 35 on its inner side, via which the inner ring 34 can be rotated with respect to the outer ring 36 with the aid of a pitch drive, and thus the angular position of the rotor blade can be adjusted. In this, the stiffening element 10 and its circulating ring 12 in particular are formed such that they do not come into contact with the inner ring.

Figure 3:
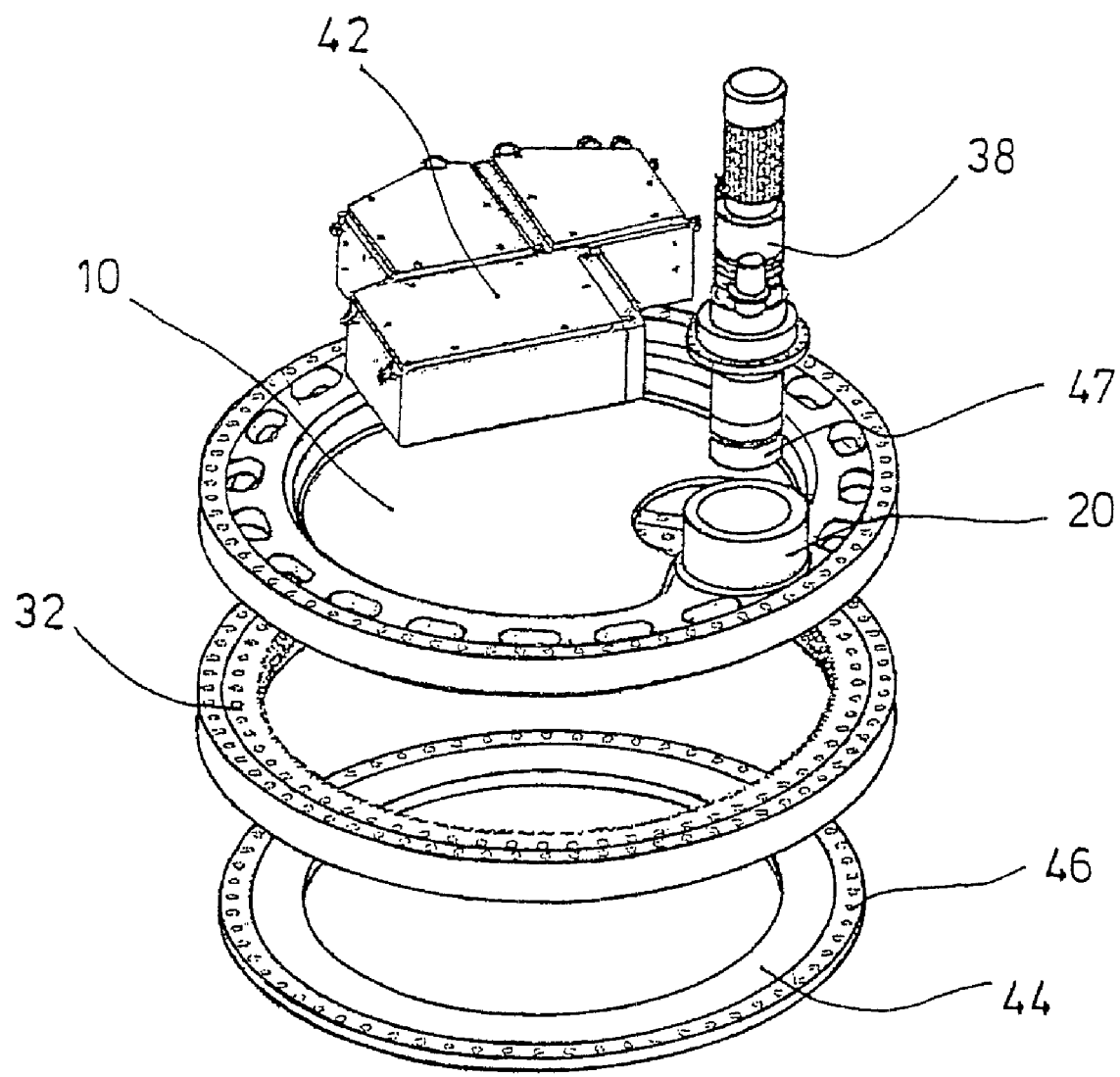
FIG. 3 shows the stiffening element according to the present invention with components of the pitch system, the pitch bearing and a second stiffening element at the rotor blade side.

FIG. 3 shows the stiffening element 10 in its function as a carrier element for components 38, 42 of the pitch system. The pitch drive 38 of the pitch system is fastened on the attachment lug 20 and passes through the stiffening element 10, so that it meshes with a pinion 47 in the toothing 35 of the inner ring of the pitch bearing 32. Switching cabinets 42 for a power supply and control, for a converter and for an accumulator for instance, are only schematically represented in FIG. 3. The pitch drive as well as the switching cabinets 42 are pre-mounted on the stiffening element 10 and can be tested independently from the rotor hub housing.

In FIG. 3, a second stiffening element 44 is represented in addition. With its through-bores 46, the stiffening element 44 corresponds to the through-bores in the inner ring of the pitch bearing. The stiffening element 44 is screwed between pitch bearing and blade root of the rotor blade (not shown).

The stiffening element 10 according to the present invention has a series of advantages. For instance, the technical requirements of casting when the rotor hub housing 28 is produced are significantly reduced, because the stiffening elements 10 and the rotor hub housing 28 are cast separately from each other. Through this, the manufacturing cost is reduced and the casting quality is improved. By mounting components of the pitch system on the stiffening element 10, additional carrier constructions are avoided, which had to be provided for mounting the components up to now. Even the mounting itself is simplified, because the components of the pitch system are also mounted directly when the stiffening element 10 is mounted.

The rotor side stiffening element 44 is formed such that together with the rotor blade root (not shown), it has a stiffness approximately equal to that of the rotor hub housing 28 and of the stiffening element 10 at the rotor hub housing side, through which similar stiffness conditions result on the junctions of inner and outer ring. Through this co-operation of the stiffening elements, the loads acting on the pitch bearing 32 are minimised and its lifespan is increased.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind energy plant with a rotor hub housing (28), which is connectable to at least one pitch bearing (32) via a joining, and with at least one rotor blade, the blade root of which is connected to the pitch bearing, characterised in that a stiffening element (10) is provided, which is fastened between the pitch bearing (32) and the rotor hub housing (28), wherein at the rotor blade side of the pitch bearing (32), an additional stiffening element (44) is provided on the rotor blade.

2. A wind energy plant according to claim 1, characterised in that the stiffening element (10) has circularly arranged through-bores (26).

3. A wind energy plant according to claim 1, characterised in that for the connection of stiffening element (10) and pitch bearing (32) on the rotor hub housing (28), the same joining is used.

4. A wind energy plant according to claim 1, characterised in that screws (33) are provided as the joining.

5. A wind energy plant according to claim 1, characterised in that the stiffening element (10) carries components (38, 40, 42, 43) of the pitch system.

6. A wind energy plant according to claim 1, characterised in that the stiffening element (10) has the shape of a ring.

7. A wind energy plant according to claim 1, characterised in that the stiffening element has the form of a plate, disc or vat.

8. A wind energy plant according to claim 7, characterised in that the stiffening element (10) has one or several openings (16).

9. A wind energy plant according to claim 8, characterised in that the one or more of the opening(s) (16) is realised as a manhole.

10. A wind energy plant according to claim 1, characterised in that the stiffening element is made from metal.

11. A wind energy plant according to claim 1, characterised in that the junction of rotor hub housing (28) and stiffening element (10) and the rotor blade fixed on the pitch bearing in the region of its blade root have approximately the same stiffness.

12. A wind energy plant according to claim 1, characterised in that the pitch bearing (32) is connected to a flange at its rotor blade side and at its rotor hub side each at a time, both flanges having approximately the same stiffness.

13. A wind energy plant according to claim 1, characterised in that the stiffening element has openings (18) for the installation of the joining between the pitch bearing (32) and a rotor blade of the wind energy plant.

14. A wind energy plant with a rotor hub housing (28), which is connected to at least one pitch bearing (32), and with at least one rotor blade, the blade root of which is connected to the pitch bearing, characterised in that a stiffening element (10) is provided, which is fastened between the pitch bearing (32) and the rotor hub housing (28);

wherein at the rotor blade side of the pitch bearing (32), an additional stiffening element (44) is provided on the rotor blade, and further wherein the pitch bearing (32) is connected to a flange at its rotor blade side and at its rotor hub side each at a time, both flanges having approximately the same stiffness.

\* \* \* \* \*